United States Patent
Etou et al.

(10) Patent No.: US 8,002,329 B2
(45) Date of Patent: Aug. 23, 2011

(54) POWERED BACK DOOR FOR VEHICLE

(75) Inventors: Shinsuke Etou, Aichi (JP); Kunihiko Sugiyama, Aichi (JP); Takayuki Fukuda, Aichi (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 223 days.

(21) Appl. No.: 12/310,902

(22) PCT Filed: Sep. 12, 2007

(86) PCT No.: PCT/JP2007/067713
§ 371 (c)(1),
(2), (4) Date: Jul. 9, 2009

(87) PCT Pub. No.: WO2008/032730
PCT Pub. Date: Mar. 20, 2008

(65) Prior Publication Data
US 2010/0066120 A1    Mar. 18, 2010

(30) Foreign Application Priority Data
Sep. 12, 2006 (JP) ................. 2006-246562

(51) Int. Cl.
*B60J 5/00* (2006.01)
(52) U.S. Cl. .................................. 296/146.4
(58) Field of Classification Search ............... 296/146.4, 296/146.9, 106, 146.1, 146.11, 146.5, 146.6, 296/53, 146.7, 146.8, 193.06; 280/728.2
See application file for complete search history.

(56) References Cited

U.S. PATENT DOCUMENTS

| | | | |
|---|---|---|---|
| 6,367,199 B2 * | 4/2002 | Sedlak et al. | 49/340 |
| 6,382,706 B2 * | 5/2002 | Yuge et al. | 296/146.4 |
| 6,398,288 B1 * | 6/2002 | Yuge | 296/146.4 |
| 6,401,392 B1 * | 6/2002 | Yuge | 49/340 |
| 6,425,205 B2 * | 7/2002 | Wygle et al. | 49/349 |
| 6,550,839 B2 * | 4/2003 | Rogers et al. | 296/56 |

(Continued)

FOREIGN PATENT DOCUMENTS
JP    1-174216 U    12/1989
(Continued)

OTHER PUBLICATIONS

International Search Report mailed on Dec. 18, 2007 for the corresponding International patent application No. PCT/JP2007/067713 (English translation enclosed).

*Primary Examiner* — Kiran B. Patel
(74) *Attorney, Agent, or Firm* — Posz Law Group, PLC (57) ABSTRACT

In a powered back door for a vehicle, which is opened and closed automatically by the drive device, a projecting end of a connection rod of a drive device is connected to an inner peripheral surface of a door frame around a door window opening of a back door, an opening is formed in a door garnish adapted to cover the inner peripheral surface of the door frame in the connection position between the door frame and the connection rod so as to open toward a vehicle compartment, a space is formed between the inner peripheral surface and the door garnish so as to be interconnected with the opening, and the projecting end of the connection rod is connected to the inner peripheral surface of the door frame in the space to conceal the connection section between the door frame and the connection rod.

4 Claims, 6 Drawing Sheets

U.S. PATENT DOCUMENTS

| | | | |
|---|---|---|---|
| 6,776,443 B2 * | 8/2004 | Shimura et al. | 296/56 |
| 6,776,448 B2 * | 8/2004 | Matsui et al. | 296/146.4 |
| 6,814,392 B1 * | 11/2004 | Tomaszewski | 296/146.4 |
| 7,014,248 B2 * | 3/2006 | Yokota et al. | 296/146.4 |
| 7,017,973 B2 * | 3/2006 | Sera et al. | 296/146.1 |
| 7,063,373 B2 * | 6/2006 | Chikata et al. | 296/146.4 |
| 7,144,066 B2 * | 12/2006 | Omori et al. | 296/146.8 |
| 7,159,927 B2 * | 1/2007 | Ihashi et al. | 296/146.8 |
| 7,370,905 B2 * | 5/2008 | Watanabe | 296/146.4 |
| 7,429,073 B2 * | 9/2008 | Watanabe et al. | 296/146.4 |
| 7,511,396 B2 * | 3/2009 | Sesita et al. | 310/179 |
| 7,517,003 B2 * | 4/2009 | Okada et al. | 296/146.8 |
| 7,808,197 B2 * | 10/2010 | Kimura et al. | 318/469 |
| 7,845,706 B2 * | 12/2010 | Watanabe et al. | 296/146.8 |
| 2006/0006692 A1 * | 1/2006 | Takahashi et al. | 296/146.4 |
| 2006/0125283 A1 * | 6/2006 | Guler | 296/146.4 |

FOREIGN PATENT DOCUMENTS

| | | |
|---|---|---|
| JP | 2003-336448 A | 11/2003 |
| JP | 2004-230993 A | 8/2004 |
| JP | 2006-231970 A | 9/2006 |

* cited by examiner

POWERED BACK DOOR FOR VEHICLE

This application is a U.S. national stage application of PCT/JP2007/067713 filed on Sep. 12, 2007, and claims priority to, and incorporates by reference, Japanese Patent Application No. 2006-246562 filed on Sep. 12, 2006.

TECHNICAL FIELD

The present invention relates to a hatchback-type back door for opening and closing a door opening provided in a back surface of a vehicle body and, more particularly, to a powered back door for a vehicle, in which the hatchback-type back door can be automatically driven with a drive device.

BACKGROUND

Figure 5:
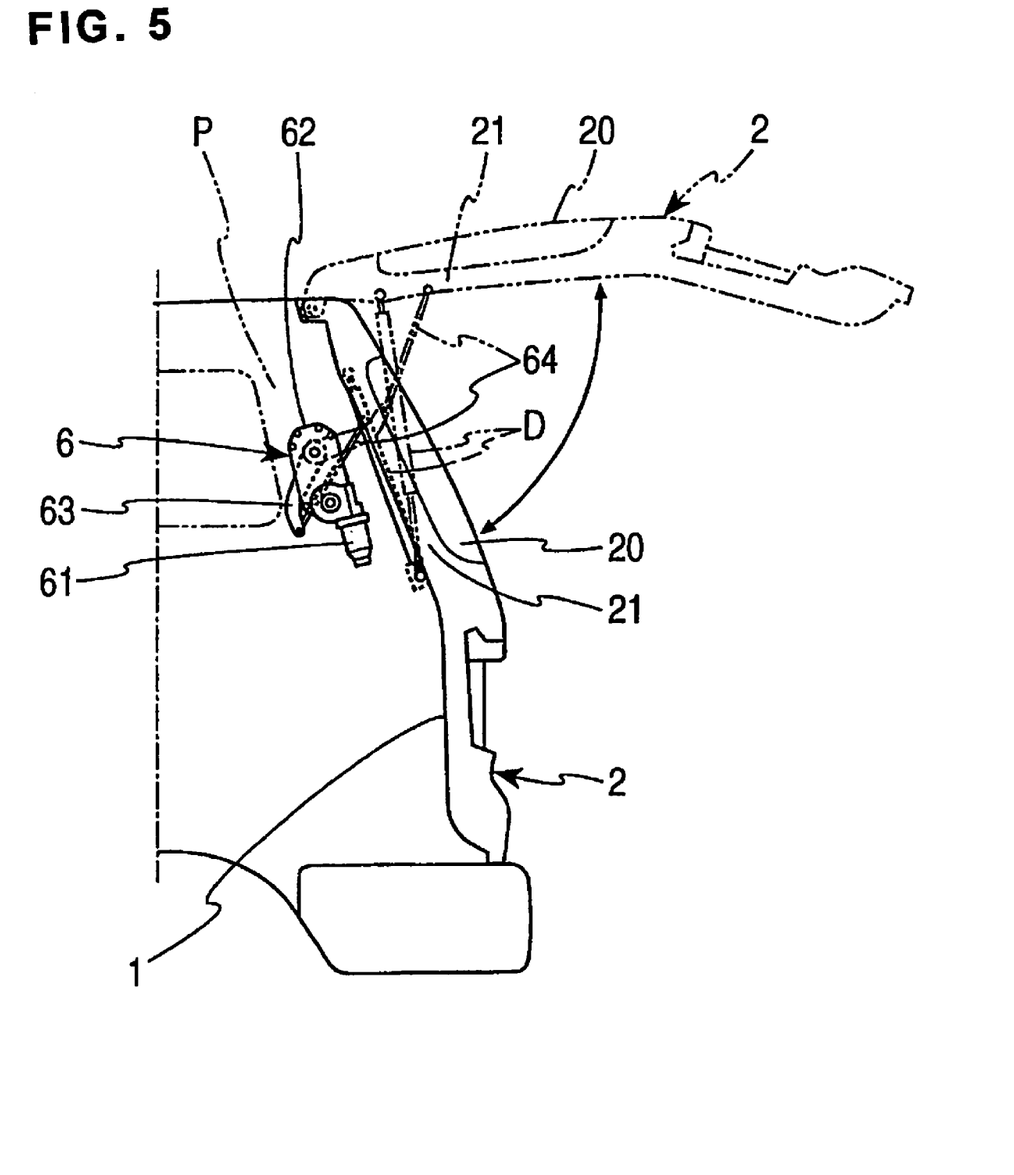
FIG. 5 is a side view showing a powered back door of a prior art wagon type vehicle, SUV, etc.

As shown in FIG. 5, a door opening 1 in a back surface of a body of a vehicle such as a wagon type vehicle, SUV, etc. is opened and closed with a hatchback-type back door 2. In one example of the conventional hatchback-type back door 2, the back door 2 is connected to a drive device 6 provided in a vehicle compartment with a connection rod 64, and is automatically driven with the drive device 6 (See Patent documents 1 and 2, for example.) Patent documents 1 and 2 also disclose a control device operating to prevent collision of a door with obstacles when the door is opened and closed.

Figure 6:
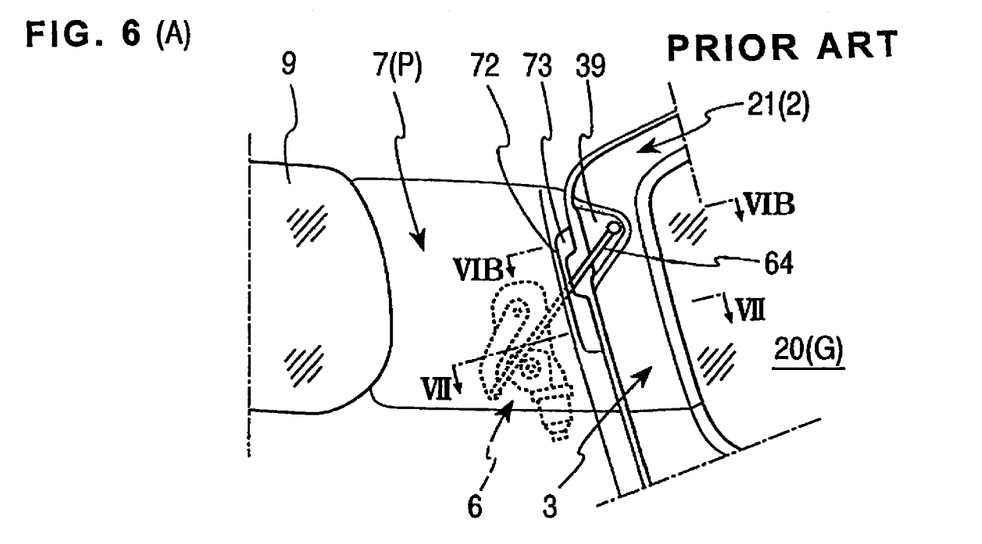
FIG. 6(A) is a side view showing a prior art structure of a connection section between a back door and a drive device along with a surrounding area thereof, which is seen from a vehicle compartment.
FIG. 6(B) is a sectional view taken along line VIB-VIB of FIG. 6(A).
Figure 7:
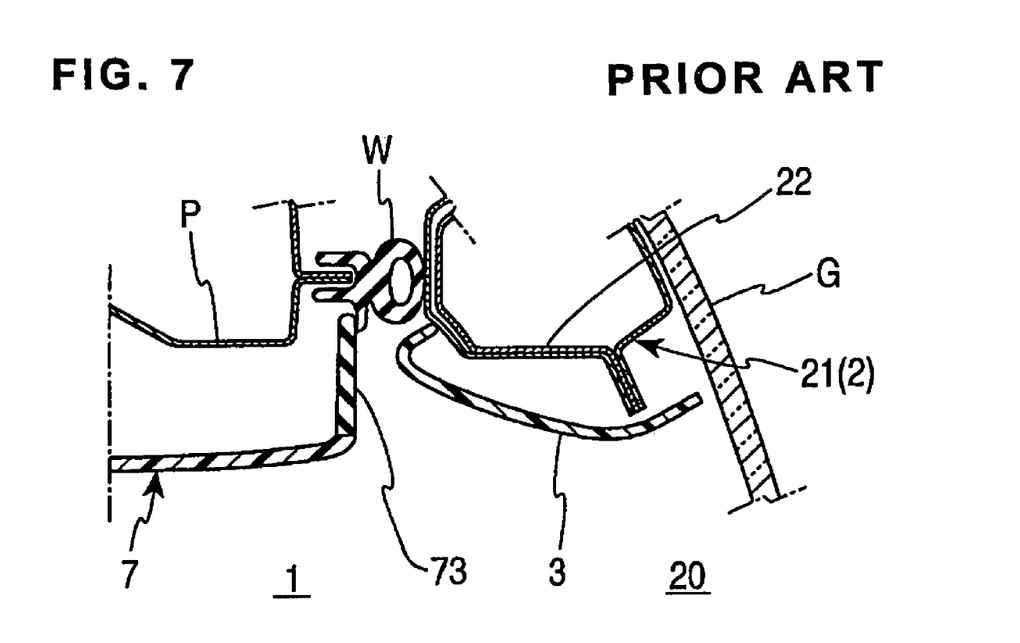
FIG. 7 is a sectional view taken along line VII-VII of FIG. 6(A).

FIGS. 6 and 7 illustrate a typical example of a conventional connecting structure between the powered back door and the drive device, along with a structure therearound. The drive device 6 is provided between an interior surface of a rear pillar P and a pillar garnish 7 composed of a synthetic resin plate and adapted to cover the interior surface of the rear pillar P. The connection rod 64 projects from the drive device 6 rearwardly via an opening 72 formed in a rear part of the pillar garnish 7 and enters the door opening 1 so as to move diagonally upwardly and downwardly. And a projecting end of the connection rod 64 is connected to a door frame 21 around a door window opening 20 of the back door 2. A rubber fin 73 is provided in the opening 72 of the pillar garnish 7 to close the opening 72 while allowing the passage of the connection rod 64.

An inner peripheral surface 22 of the door frame 21 is covered with a door garnish 3. The door garnish 3 is composed of a synthetic resin and has a depression 39 with a generally triangular configuration in a position facing the vehicle compartment. A connection shaft 23 is secured to the inner peripheral surface 22 and projects from the depression 39, after penetrating the same. The projecting end of the connection rod 64 is turnably connected to the connection shaft 23, and the back door 2 is driven with the forward and rearward movement of the connection rod 64. In FIG. 6 and FIG. 7, reference character G designates a door window glass, W designates a weather strip adapted to provide a seal between the door opening 1 and the back door 2, and 9 designates a quarter window provided in a side surface of a vehicle body.

Patent Document 1: Japanese patent application laid-open No. 2003-336448
Patent Document 2: Japanese patent application laid-open No. 2004-230993

Figure 8:
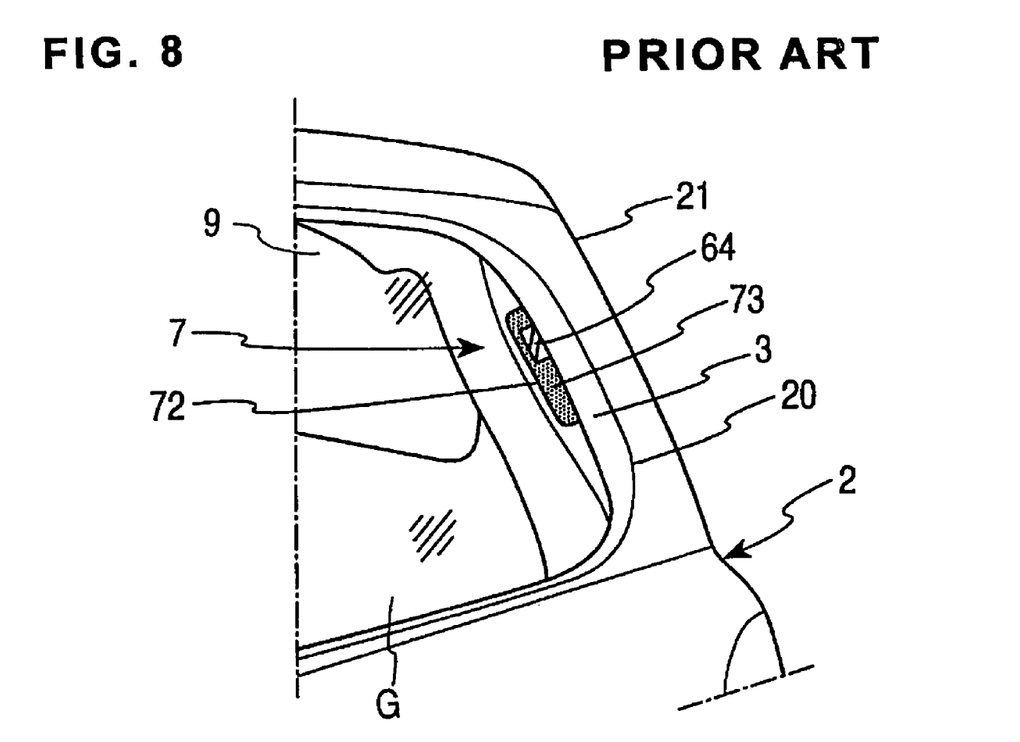
FIG. 8 is a view showing a prior art structure around a connection section, which is seen from a back side of the vehicle body.

In the thus constructed conventional connecting structure between the back door 2 and the drive device 6, the projecting end of the connection rod 64 is connected to the back door 2 outside the door garnish 3 of the door frame 21 so that when the back door 2 is closed, the opening 72 of the pillar garnish 7, and the connection section between the projecting end of the connection rod 64 and the door frame 21 are visible from the vehicle compartment to degrade the internal appearance. In addition, the interior surface of the rear pillar P and the drive device 6 are covered with the pillar garnish 7 so that the pillar garnish 7 protrudes in the vehicle compartment. As a result, as shown in FIG. 7, a level difference is generated between the pillar garnish 7 and the door garnish 3, whereby they lack unity in appearance and, as shown in FIG. 8, the opening 72 of the pillar garnish 7 is exposed via the door window glass G of the back door 2 to degrade the external appearance of the back surface of the vehicle body.

SUMMARY

Accordingly, the present invention has been made in view of the above-described circumstances, and to provide a powered back door for a vehicle, in which a connection section between the back door and a connection rod of a drive device along with a surrounding area thereof is not exposed to provide good external appearance.

In accordance with the present invention, in a powered back door for a vehicle, in which a hatchback-type back door for opening and closing a door opening provided in a back surface of a vehicle body, is connected to a drive device provided in a vehicle compartment with a connection rod projecting from the drive device towards the back door to automatically open and close the back door, a projecting end of the connection rod is connected to an inner peripheral surface of a door frame around a door window opening of the back door, which faces a vehicle compartment. An opening is provided in a door garnish that covers the inner peripheral surface of the door frame in a connecting position between the door frame and the connection rod so as to open toward the vehicle compartment, a space is provided between the inner peripheral surface and the door garnish so as to be interconnected with the opening, and the projecting end of the connection rod is inserted in the space via the opening, and is connected to the inner peripheral surface of the door frame in the space.

The door frame and the connection rod are connected in the space provided between the inner peripheral surface of the door frame and the door garnish adapted to cover the inner peripheral surface so that the door garnish conceals the connection section without exposing the same to the vehicle compartment to provide good appearance.

An internal member is provided between the door frame and the door garnish to define the above-described space with a bag-like configuration, which is interconnected with the vehicle compartment via the opening, and is closed on a bottom side thereof, a connection shaft is provided to project from the inner peripheral surface of the door frame into the space, after penetrating the internal member, and the projecting end of the connection rod is connected to the connection shaft. By providing the internal member between the door frame and the door garnish, the inner peripheral surface of the door frame is concealed to improve the appearance therearound.

The internal member is secured to a reverse surface of the door garnish with first engaging means, and secured to the inner peripheral surface of the door frame with second engaging means. The internal member can be attached to both the door garnish and the inner peripheral surface of the door frame at accurate attaching positions.

The drive device is provided between an interior surface of a rear pillar of a vehicle body, which defines a side edge of the door opening, and a pillar garnish adapted to cover the interior surface of the rear pillar, the connection rod is projected toward the back door via an opening formed at a rear end of the pillar garnish, and the door garnish is provided so as to be approximately flush with an interior surface of the pillar garnish so as to conceal the opening provided at the rear end of the pillar garnish from a rear side of the vehicle body, when the back door is closed. A level difference between the pillar garnish and the door garnish is eliminated, and the opening of the pillar garnish is concealed with the door garnish from the rear side of the vehicle body to provide good appearance in the back surface thereof.

DETAILED DESCRIPTION

Hereinafter, the present invention will be explained based on one embodiment wherein the powered back door of the present invention is applied to a hatchback type back door for opening and closing a door opening 1 provided in a back surface of a vehicle body of a wagon type vehicle, a SUV, etc. shown in FIG. 5 upwardly and downwardly. The structure of a drive device 6 provided in the vehicle body for automatically driving the back door is substantially identical to the conventional one.

Figure 1:
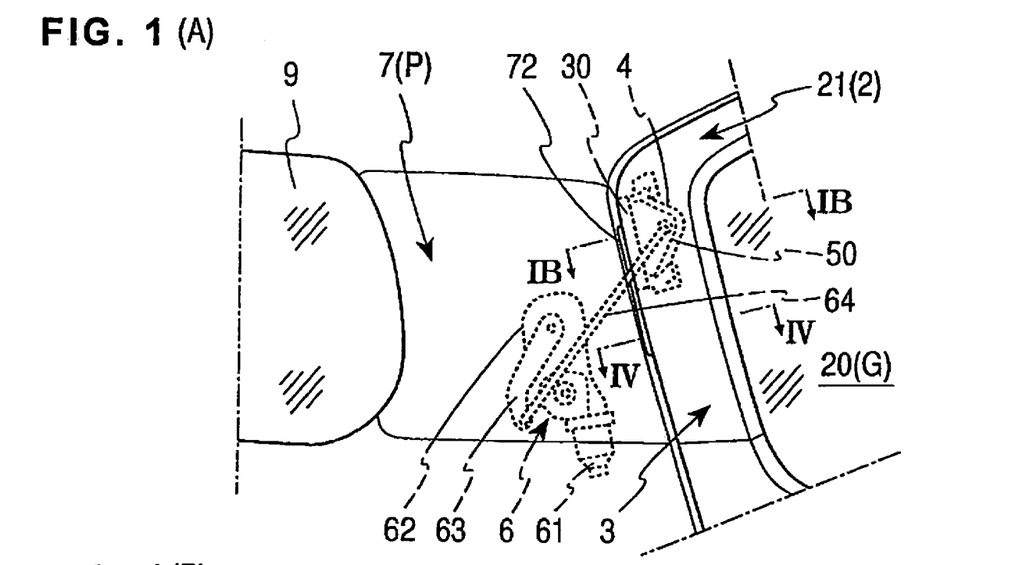
FIG. 1(A) is a side view showing a structure of an exemplary embodiment of a connection section between a back door and a drive device along with a surrounding area thereof, which is seen from a vehicle compartment.
FIG. 1(B) is a sectional view taken along line IB-IB of FIG. 1(A).

As shown in FIG. 1 and FIG. 5, the drive device 6 is secured to an interior surface of a rear pillar P and is concealed with a pillar garnish 7 composed of a synthetic resin plate along with the interior surface of the rear pillar P. The drive device 6 includes an electric motor 61, a gear box 62 and a turn arm 63 driven with the electric motor 61 and the gear box 62. And a connection rod 64 is provided at an end of the turn arm 63 so as to extend backwardly.

The connection rod 64 is provided such that when the electric motor 61 is driven, the turn arm 63 is turned via the gear box 62 to move the connection rod 64 rearwards and diagonally upwards. The connection rod 64 projects toward the back door 2 via an opening 72 of the pillar garnish 7, and a projecting end of the connection rod 64 is connected to a door frame 21 of the back door 2. An elastic rubber fin 73 is provided in the opening 72 of the pillar garnish 7, similarly to the conventional structure. In FIG. 1, reference character G designates a door window glass, and in FIG. 5, D designates a gas damper adapted to support the back door 2 in the hatchback position when the door opening is opened.

As shown in FIGS. 1 through 4, the door frame 21 of the back door 2, which surrounds a door window opening 20, includes an outer panel and an inner panel to define a closed cross-section, and a reinforcement panel is provided along the inner panel in the closed cross-section of the door frame 21 to reinforce the same. A connection shaft 23 adapted to connect the projecting end of the connection rod 64 is provided in an inner peripheral surface 22 of the door frame 21 so as to face the door window opening 20. The connection shaft 23 is screwed to a screw hole provided in the inner peripheral surface 22 to project in the door window opening 20, and a projecting end thereof has a ball-like configuration.

Figure 2:
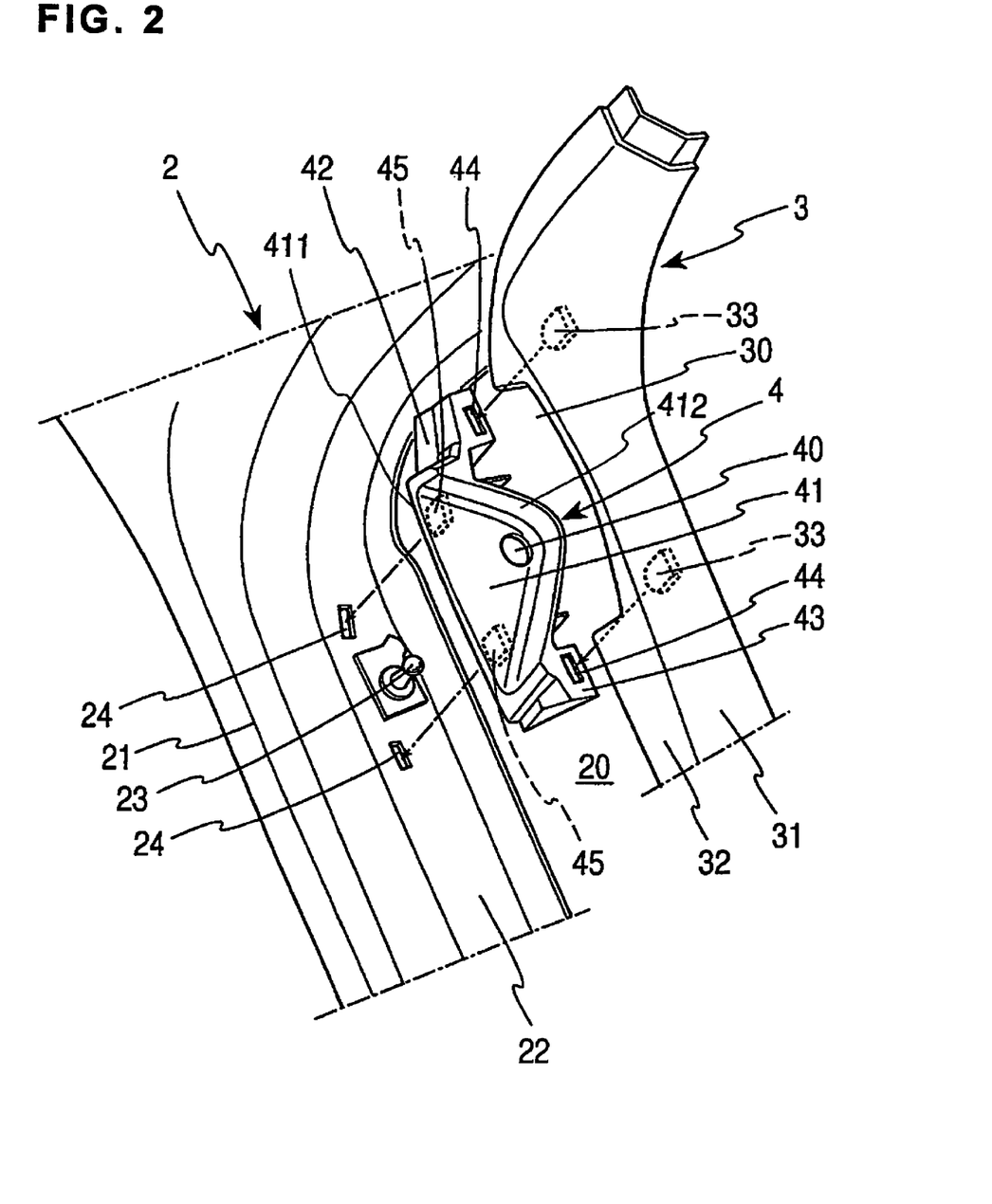
FIG. 2 is an exploded perspective view showing the structure around the connection section of FIG. 1.
Figure 4:
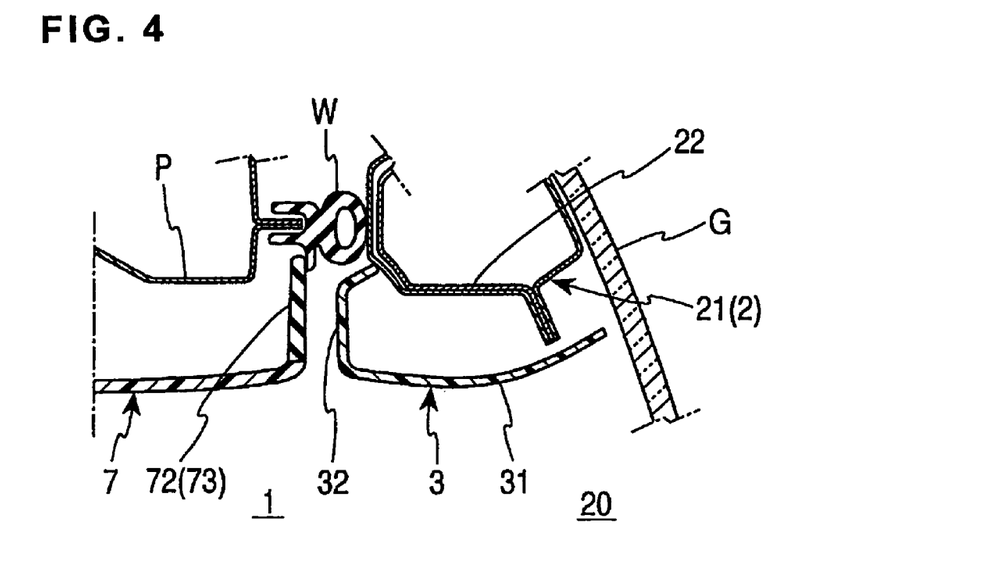
FIG. 4 is a sectional view taken along line IV-IV of FIG. 1(A).

The inner peripheral surface 22 of the door frame 21 is covered with a door garnish 3 composed of a synthetic resin plate. The door garnish 3 extends vertically along the inner peripheral surface 22, and has a main part 31 and a front end part 32. The main part 31 is located on the side of the door window opening 20 and faces the inner peripheral surface 22 in parallel thereto with a space greater than a projecting amount of the connection shaft 23. The main part 31 of the door garnish 3 covers both the inner peripheral surface 22 and the connection shaft 23. As shown in FIG. 2 and FIG. 4, the front end part 32 of the door garnish 3 protrudes from the main part 31 towards a front edge of the inner peripheral surface 22 to define a generally L-shaped cross-section, and a front end of a space between the main part 31 and the inner peripheral surface 22 is closed with the front end part 32. An upper end of the door garnish 3 curves towards an upper frame of the door frame 21, and is connected to another door garnish (not shown) adapted to cover the upper frame of the door frame 21.

As shown in FIG. 1, the door garnish 3 has an opening 30 that is formed by cutting the front end part 32 in the position corresponding to the connection shaft 23. The opening 30 has a vertically long rectangular configuration extending upwardly and downwardly of the position corresponding to the connection shaft 23.

Figure 3:
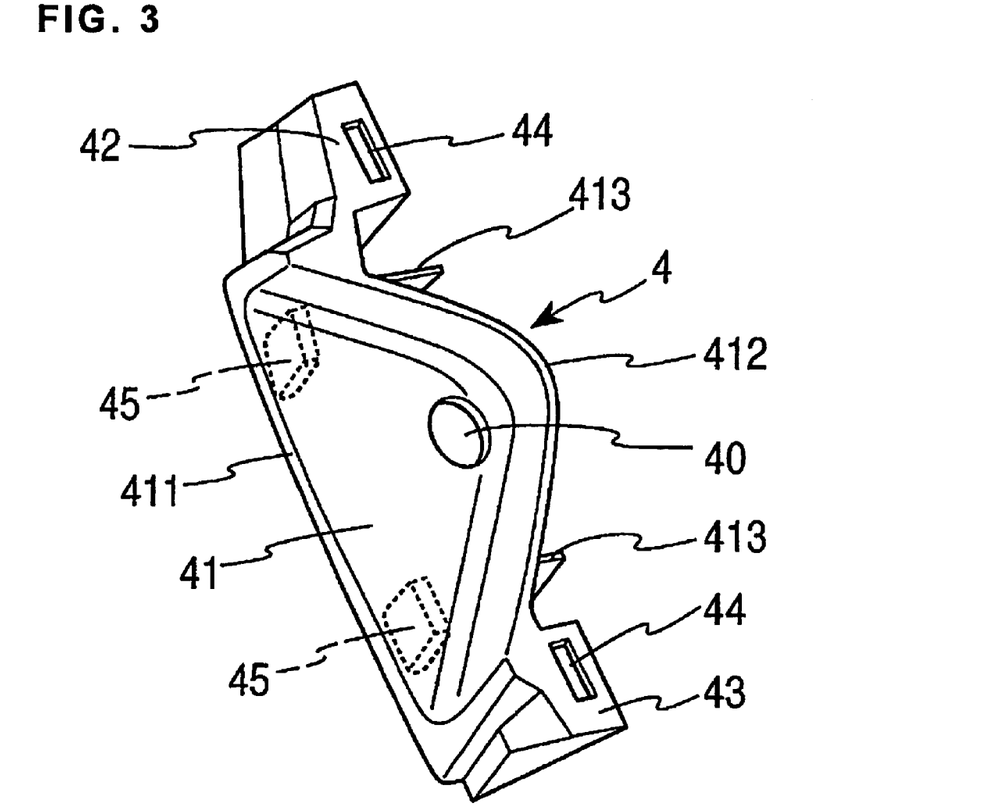
FIG. 3 is a perspective view of an internal member to be used in the above exemplary embodiment of the present invention.

An internal member 4 composed of a synthetic resin is attached to a reverse surface of the door garnish 3 in the position facing the opening 30 across a space between the door garnish 3 and the door frame 21. The internal member 4 conceals the inner peripheral surface 22 of the door frame 21, and defines a space 50 with the door garnish 3. The space 50 has a bag-like configuration that opens towards the opening 30 of the door garnish 3 and is closed at a rear side thereof. As shown in FIG. 1, FIG. 2 and FIG. 3, the internal member 4 has a generally triangular-shaped bottom part 41. A straight front wall 411 and a generally L-shaped peripheral wall 412 project therefrom.

The internal member 4 has a through hole 40 in the rear corner of the bottom part 41 for inserting the connection shaft 23 therein. An upper attaching part 42 is provided in the vicinity of an upper end of the peripheral wall 412 and a lower attaching part 43 is provided in the vicinity of a lower end thereof. Attaching surfaces of the upper attaching part 42 and the lower attaching part 43 are arranged so as to be flush with an upper edge of the peripheral wall 412. Each of the attaching portions 42 and 43 is provided with an engaging hole 44 having a vertically long rectangular configuration. Each engaging hole 44 is adapted to be engaged with each of engaging pieces 33 as first engaging means, which project from the reverse surface of the door garnish 3. In addition, engaging pieces 45 as second engaging means are provided in a reverse surface of the bottom part 41 of the internal member 4 so as to project from upper and lower positions along the front wall 411.

The internal member 4 is secured to the reverse surface of the door garnish 3 by fitting the engaging pieces 33, 33 projecting from the reverse surface of the door garnish 3 in the engaging holes 44, 44 of the upper and lower attaching portions 42 and 43 such that the upper edge of the peripheral wall 412 contacts the reverse surface of the door garnish 3, thereby defining the space 50 (FIG. 1). The thus defined space 50 has a bag-like configuration that opens frontwardly, namely, towards a vehicle compartment, via the opening 30 provided in the front end part 32 of the door garnish 3.

The internal member 4 is also secured to the inner peripheral surface 22 of the door frame 21 by inserting the connection shaft 23 in the through hole 40 of the internal member 4, and fitting the engaging pieces 45, 45 projecting from the reverse surface of the bottom part 41 in the engaging holes 24, 24, each having a vertically long rectangular configuration and being provided in the inner peripheral surface 22 of the door frame 21, with the ball-like end of the connection shaft 23 being protruded into the space 50.

And the projecting end of the connection rod 64 inserted via the opening 30 is connected to the connection shaft 23 in the space 50. Upon connecting the connection rod 64 to the connection shaft 23, the internal member 4 is previously secured to the inner peripheral surface 22 of the door frame 21, and a ball joint 641 provided at an projecting end of the connection rod 64 is fitted to the ball-like end of the connection shaft 23 so as to turn upwardly and downwardly. Then, the door garnish 3 is attached to the inner peripheral surface 22 of the door frame 21 so as to cover the same using attaching means (not shown), and the reverse surface of the door garnish 3 is secured to the internal member 4.

In accordance with the present embodiment, the connection rod 64 of the drive device 6 is connected to the connection shaft 23 of the door frame 21 in the space 50 provided along the reverse surface of the door garnish 3 so that when the back door 2 is closed, the connection section is not exposed to the vehicle compartment to improve the appearance therearound. In addition, since the internal member 4 is provided on the rear side of the door garnish 3 to define a bag-shaped space 50 along the reverse surface of the door garnish 3, the internal member 4 conceals the inner peripheral surface 22 of the door frame 21 inwardly of the opening 30 even when the back door 2 is open, whereby the appearance inside the opening 30 can be made good.

The internal member 4 is secured to both the door garnish 3 and the inner peripheral surface 22 of the door frame 21, and consequently, the internal member 4 can be attached to accurate attaching positions of the reverse surface of the door garnish 3 and the inner peripheral surface 22 of the door frame 21. Therefore, the internal member 4 can be attached in the position facing the opening 30 of the door garnish 3 without occurrence of any slippage relative to the door garnish and the inner peripheral surface 22 of the door frame 21, whereby the connection shaft 23 can be securely inserted in the through hole 40.

The door garnish 3 is arranged such that the main part 31 thereof is spaced from the inner peripheral surface 22 of the door frame 21, and defines an L-shaped cross-section with the front end part 32, and consequently, when the back door 2 is closed, the front end part 32 can be made to face the rear end surface of the pillar garnish 7 close to the same, and the interior surface of the pillar garnish 7 and the main part 31 of the door garnish 3 can be made approximately flush with each other without generating such a level difference as has been encountered with the conventional structure, whereby the pillar garnish 7 and the door garnish 3 can present unity in appearance. And since the door garnish 3 conceals the rear end surface of the pillar garnish 7 and the opening 72 from the rear side thereof, they are not exposed via the door window glass G of the back door 2, whereby the appearance of the back surface of the vehicle body can be improved.

The above-described embodiment is one example of the present invention, and accordingly, the present invention is not limited to this embodiment, but covers various modifications and variations of the above-described embodiment. For example, in the above-described embodiment, the internal member 4 is formed to have a triangular configuration, but the configuration of the internal member 4 is not limited to this configuration, the internal member 4 may have other configurations such as a semi-circular configuration, rectangular configuration, etc.

The invention claimed is:

1. A powered back door for a vehicle, in which a hatchback back door for opening and closing a door opening provided in a back surface of a vehicle body, is connected to a drive device provided in a vehicle compartment with a connection rod projecting from the drive device towards the back door to automatically open and close the back door, wherein a projecting end of the connection rod is connected to an inner peripheral surface of a door frame around a door window opening of the back door, which faces the vehicle compartment, an opening is provided in a door garnish adapted to cover said inner peripheral surface of said door frame in a connecting position between said door frame and the connection rod so as to open towards the vehicle compartment, a space is provided between said inner peripheral surface and said door garnish so as to be interconnected with said opening, and said projecting end of the connection rod is inserted in said space via said opening, and is connected to said inner peripheral surface of said door frame in said space.

2. The powered back door for a vehicle as claimed in claim 1, wherein an internal member is provided between said door frame and said door garnish to define said space with a bag configuration that is interconnected with the vehicle compartment via said opening and is closed on a rear side thereof, a connection shaft is provided to project from said inner peripheral surface of said door frame into said space via said internal member, and said projecting end of the connection rod is connected to said connection shaft.

3. The powered back door for a vehicle as claimed in claim 2, wherein said internal member is secured to a reverse surface of said door garnish with first engaging means, and secured to said inner peripheral surface of said door frame with second engaging means.

4. The powered back door for a vehicle as claimed in claim 1, wherein the drive device is provided between an interior surface of a rear pillar of a vehicle body, which defines a side edge of said door opening, and a pillar garnish adapted to cover said interior surface, the connection rod is projected towards the back door via an opening formed at a rear end of said pillar garnish, and said door garnish is provided so as to be approximately flush with said interior surface of said pillar garnish so as to conceal said opening provided at said rear end of said pillar garnish from a rear side of the vehicle body, when the back door is closed.

* * * * *